(12) United States Patent
Imagawa et al.

(10) Patent No.: US 8,828,228 B2
(45) Date of Patent: Sep. 9, 2014

(54) IN-LINE STRAINER

(75) Inventors: Yoshinari Imagawa, Wakayama (JP);
Naruki Yukura, Wakayama (JP)

(73) Assignee: Yamaho Industry Co., Ltd., Wakayama (JP)

( * ) Notice: Subject to any disclaimer, the term of this patent is extended or adjusted under 35 U.S.C. 154(b) by 577 days.

(21) Appl. No.: 12/591,536

(22) Filed: Nov. 23, 2009

(65) Prior Publication Data

US 2011/0017655 A1    Jan. 27, 2011

(30) Foreign Application Priority Data

Jul. 24, 2009    (JP) .................................. 2009-173132

(51) Int. Cl.
*B01D 29/00* (2006.01)
*B01D 35/02* (2006.01)
*B01D 29/11* (2006.01)

(52) U.S. Cl.
CPC .............. *B01D 35/02* (2013.01); *B01D 29/114* (2013.01)
USPC .......................... 210/336; 210/512.1; 210/337

(58) Field of Classification Search
CPC ............................... B01D 29/114; B01D 35/02
USPC ................ 210/336, 787, 512.1, 512.2, 512.3, 210/360.1, 369
See application file for complete search history.

(56) References Cited

U.S. PATENT DOCUMENTS

| | | | | |
|---|---|---|---|---|
| 4,295,969 A | * | 10/1981 | Hagberg | 210/223 |
| 4,572,783 A | * | 2/1986 | Watson | 210/109 |
| 4,673,495 A | * | 6/1987 | Carroll et al. | 210/232 |
| 5,490,868 A | | 2/1996 | Whitlock et al. | |
| 7,846,343 B2 | * | 12/2010 | Schook | 210/787 |

* cited by examiner

*Primary Examiner* — Tony G Soohoo
*Assistant Examiner* — Peter Keyworth
(74) *Attorney, Agent, or Firm* — Wenderoth, Lind & Ponack, L.L.P.

(57) ABSTRACT

An in-line strainer 1 includes: a cylindrical-shaped housing 2 having an inflow port 6 for liquid and an outflow port 7 which are coaxial with each other; and a strainer element 22 disposed in the housing 2. A cyclone cylindrical body 28 having a diametrically-reduced cylinder portion 30 whose inner diameter is reduced toward one end, and having a cyclone inflow port formed on the other end, is arranged inside the housing 2 such that the diametrically-reduced cylinder portion 30 is close to the inflow port 6, and that the cyclone inflow port is close to the outflow port 7. A cylindrical-shaped strainer element 22 having a closed first end and an open second end is in the cyclone cylindrical body 28, and an open second end 25 of the strainer element 22 is connected to the outflow port 7 of the housing 2.

2 Claims, 11 Drawing Sheets

Prior Art

IN-LINE STRAINER

BACKGROUND OF THE INVENTION

1. Field of the Invention

The present invention relates to an in-line strainer disposed in a pipe line for spraying a liquid such as an agricultural chemical solution and the like, so as to be coaxial with the pipe line.

2. Description of the Background Art

An example of conventional in-line strainers as described above is shown in FIG. 11A. An in-line strainer 61A shown in the diagram includes a housing 62 which includes a cylindrical-shaped main body case 63 having an inflow port 66 arranged at one end of the cylinder, and a main body lid 64 fitted to the other end of the cylinder of the main body case 63 in a sealed manner. Inside the housing 62, a valve seat 95 is formed in the vicinity of the inflow port 66, and a valve element 92 for opening or closing the valve seat 95 is installed. A cylindrical-shaped strainer element 83A is disposed between an inner circumference surface of the main body case 63 and the valve element 92 so as to be coaxial with the housing. The strainer element 83A is held by a holding member 90 which is pressed by the lower surface of the main body lid 64 and which allows a liquid to pass therethrough. The valve element 92 is urged, by a coil spring 91 disposed between the valve element 92 and the holding member 90, toward a direction in which the valve seat 95 is closed. The inflow port 66 is connected to, for example, a hose which is connected to a pump, and an outflow port 67 is connected to a chemical solution spraying pipe having a nozzle.

Figure 11A:
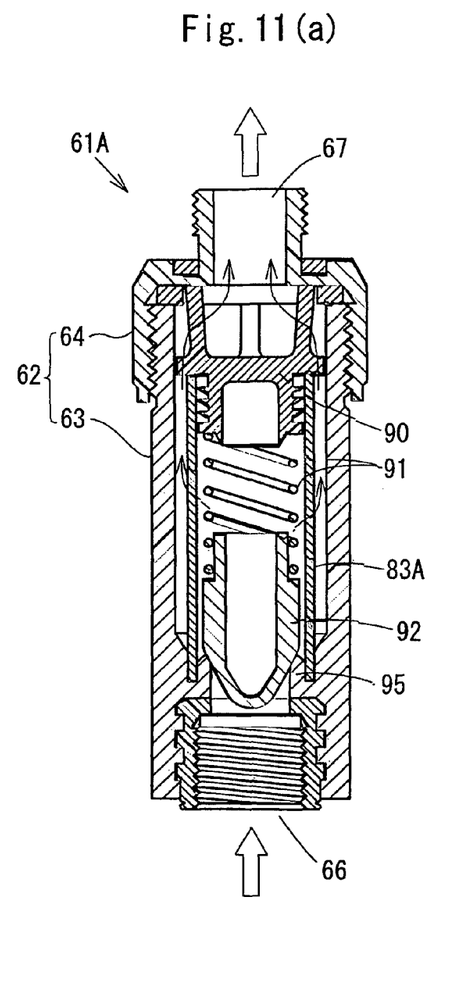
FIG. 11A is a side cross-sectional view showing an example of a conventional in-line strainer.

In the in-line strainer 61A, when an agricultural chemical solution flows from the inflow port 66, the agricultural chemical solution pushes the valve element 92 to open the valve seat 95, and thereby flows into the strainer element 83A. The agricultural chemical solution passes through the strainer element 83A from its inside to its outside, so as to filter impurities such as dirt, gravel, and the like, and is discharged, through the holding member 90, from the outflow port 67 to the chemical solution spraying pipe. Such an in-line strainer that causes the agricultural chemical solution to pass through the strainer element from its inside to its outside is disclosed in U.S. Pat. No. 5,490,868, for example.

On the other hand, another example of an in-line strainer of the type described above is shown in FIG. 11B. An in-line strainer 61B shown in the diagram includes a housing 62 similar to that included in the above-described in-line strainer 61A. This housing 62 does not include a valve seat 95, but includes a cylindrical-shaped strainer element 83B. The strainer element 83B has a first end which is closed by four crimped portions 94 which are formed in a circumferential direction of the strainer element 83B, and has a second end which is open. The open second end of the strainer element 83B is held by an inner circumferential surface of a main body lid 64 and by a coil spring 93, and is connected to an outflow port 67.

Figure 11B:
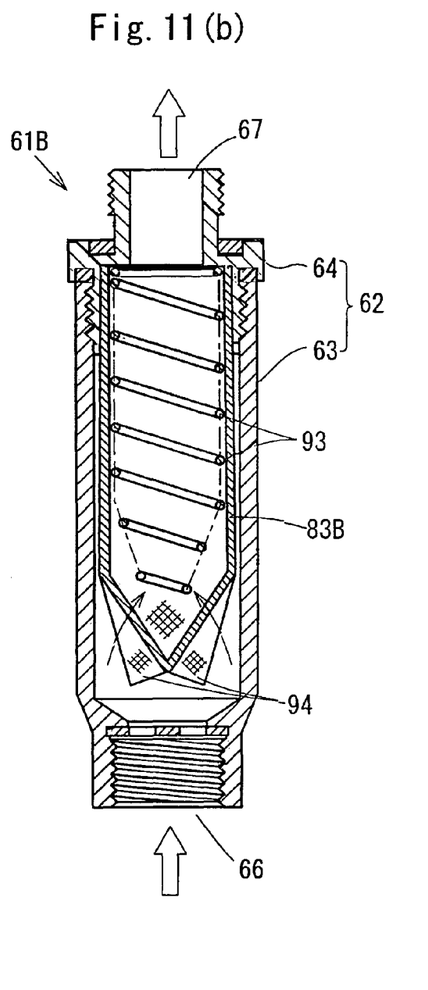
FIG. 11B is a side cross-sectional view of another example of a conventional in-line strainer.

In the in-line strainer 61B, an agricultural chemical solution flowing from an inflow port 66 to a main body case 63 passes through the strainer element 83B from its outside to its inside so as to filter impurities, and is discharged from the outflow port 67 to a chemical solution spraying pipe.

When the strainer element 83A or 83B is clogged during spraying operation, spraying force is decreased, and an amount of spraying is also decreased, resulting in unsatisfactory spraying operation. Thus, the in-line strainer 61A or 61B needs to be disassembled on the spot to remove impurities. In this case, an operator needs to stop an on-off valve which is disposed at an upstream side from the in-line strainer 61A or 61B, and also needs to remove the main body lid 64 from the main body case 63 in order to extract the strainer element 83A or 83B. That means that a whole of the pipe line from the pump to the nozzle is opened in the middle of the spraying operation, and thus there may be a case where a large amount of agricultural chemical solution is drained out of the main body case 63. Moreover, impurities on the extracted strainer element 83A or 83B need to be removed by using a brush or the like. However, impurities which are firmly stuck cannot be removed easily. Particularly, in the case of the strainer element 83A, since the impurities are accumulated on an inner surface of the element, it is difficult to remove the impurities by using a brush.

On the other hand, when a mesh of the strainer element is coarse, impurities having a large diameter pass through the strainer element, which leads to a possibility that the nozzle at the downstream side is clogged with the impurities. Thus, a strainer element having a relatively fine mesh is used, and accordingly, impurities ranging from fine-grain ones to large-gain ones are captured by the strainer element. Thus, the strainer element needs to be cleaned very frequently.

SUMMARY OF THE INVENTION

The present invention is invented in view of the above-described problems, and an object of the present invention is to provide an in-line strainer which includes a strainer element requiring less frequent cleaning, and which allows easy removal of impurities from the strainer element.

In order to attain the object mentioned above, the in-line strainer according to the present invention is an in-line strainer including: a cylindrical-shaped housing having a first cylinder end which is an inflow port for liquid and a second cylinder end which is an outflow port approximately coaxial with the inflow port; a strainer element disposed inside the housing; and a cyclone cylindrical body having a diametrically-reduced cylinder portion whose inner diameter is reduced toward a first end of the cyclone cylindrical body, and having a cyclone outflow port formed at an open second end of the cyclone cylindrical body. The cyclone cylindrical body is arranged inside the housing such that the diametrically-reduced cylinder portion is arranged close to the inflow port of the housing, and that the cyclone outflow port is connected to the outflow port of the housing. The cyclone cylindrical body has a cyclone inflow port formed on a circumferential wall thereof in the vicinity of the cyclone outflow port. The strainer element is fitted into the housing between the outflow port of the housing and the cyclone outflow port.

In the above configuration, the cyclone cylindrical body has an extraction opening portion formed at a distal end of the diametrically-reduced cylinder portion, and the housing has an external opening portion which is formed on a cylindrical wall thereof so as to be communicated with the outside. The extraction opening portion of the cyclone cylindrical body is connected to the external opening portion.

Further, in the above configuration, the strainer element is formed in a shape of a cylinder having a closed one end and an open other end, and is accommodated in the cyclone cylindrical body, and a distal end of the closed portion is directed, in the cyclone cylindrical body, to a distal end of the diametrically-reduced cylinder portion.

According to the in-line strainer of the present invention, the cyclone cylindrical body is disposed inside the housing, the strainer element is accommodated in the cyclone cylindrical body, and the strainer element is fitted to the housing between the outflow port of the housing and the cyclone outflow port. Accordingly, a part of impurities in a liquid can be captured in the cyclone cylindrical body, and the remaining impurities can be captured by the strainer element. Thus, filtration load on the whole of the strainer can be shared by the cyclone cylindrical body and the strainer element. As a result, the impurities to be captured by the strainer element are reduced, and the frequency of cleaning of the strainer element can be reduced.

Further, in the case where the external opening portion, which is communicated with the outside of the housing, is connected to the extraction opening portion at the distal end of the diametrically-reduced cylinder portion of the cyclone cylindrical body, it is possible to extract impurities accumulated in the diametrically-reduced cylinder portion of the cyclone cylindrical body out of the external opening portion through the extraction opening portion.

Still further, in the case where the distal end of the closed portion of the strainer element is directed to the distal end of the diametrically-reduced cylinder portion in the cyclone cylindrical body, a liquid, which changes its flowing direction in the diametrically-reduced cylinder portion of the cyclone cylindrical body to flow toward the strainer element, is guided smoothly along an outer circumference of the closed portion to the outside of the strainer element.

DETAILED DESCRIPTION OF THE INVENTION

An embodiment of the present invention will be described with reference to the drawings. It is noted that the embodiment described below is merely an example embodying the present invention, and should not be construed as limitation of the technical scope of the present invention.

In FIG. 1 to FIG. 6, an in-line strainer 1 of the present embodiment includes a housing 2 which includes a cylindrical-shaped main body case 3 having an inflow port 6 arranged at its first cylinder end and having an opening portion 5 arranged at its second cylinder end, and a main body lid 4 fitted to the second cylinder end of the main body case 3 so as to seal the opening portion 5. Inside the housing 2, a strainer element 22 and a cyclone cylindrical body 28 are installed, which are described later in detail. The main body lid 4 is made of brass, for example, and the main body case 3 is formed of a transparent material such as polyethylene naphthalate. The polyethylene naphthalate is a synthetic resin that excels in transparency, shock-resistance, chemical-resistance, and weather-resistance, and is preferably used for the in-line strainer 1.

In an inner circumferential surface of the main body lid 4, internal threads 10 are engraved. The internal threads 10 are designed to engage with external threads 9 which are engraved in an outer circumferential surface of the second cylinder end of the main body case 3. In addition, the main body lid 4 has a tube portion 40 projecting upwardly so as to be coaxial with the inflow port 6 in a state where the main body lid 4 seals the opening portion 5 of the main body case 3. The inside of the tube portion 40 constitutes an outflow port 7, and in an outer circumferential surface of the tube portion 40, external threads 11 are engraved. The external threads 11 are used, for example, so as to engage with internal threads of a chemical solution spraying tube (not shown).

Fitting grooves 35 are formed at a distal end of the main body case 3 on the inflow port 6 side, and a cylindrical-shaped fitting portion 12 is fitted to the fitting grooves 35. In an inner circumferential surface of the fitting portion 12, internal threads 13 are engraved. The internal threads 13 are used, for example, so as to engage with external threads (not shown) of an end of a hose. A branch pipe 14 is formed on a cylinder wall of the main body case 3, in the vicinity of the inflow port 6, and extends outwardly from the main body case 3 so as to be perpendicular to a center line of the cylinder. The branch pipe 14 has an external opening portion 15 which allows communication between an inside and an outside of the main body case 3. In an outer circumferential surface of the branch pipe 14, external threads 16 are engraved. A lid 17, which seals the external opening portion 15 of the branch pipe 14, has a column-shaped stopper 19 projecting from its rear surface. In an inner circumferential surface of the lid 17, internal threads 18 are engraved.

At a position in the inner circumferential surface of the main body case 3, the position being connected to the external opening portion 15 of the branch pipe 14, a receiving port 45, which is a semicircular receiving base, is formed. A distal end of the cyclone cylindrical body 28 is mounted on the receiving port 45, whereby the cyclone cylindrical body 28 is positioned and supported inside the main body case 3. In an upper portion of the inner circumferential surface of the main body case 3, a pair of engaging grooves 37 (see FIG. 6), which are longitudinal grooves, are formed in an opposed manner. A reference numeral 8 indicates a gasket fitted in the vicinity of an open second end 25 of the strainer element 22, and the gasket is designed to be pressed between an edge surface of the opening portion 5 of the main body case 3 and a lower surface of the main body lid 4. A reference numeral 20 indicates a gasket fitted at a root of the stopper 19 of the lid 17. A reference numeral 36 indicates a gasket fitted at a root of the tube portion 40.

The strainer element 22 includes a filter material 23 which is formed in a cylindrical shape having an open first end 24 and the open second end 25, and which is capable of allowing a liquid to pass therethrough, and a filter material 27 (closing portion) which is fitted to the filter material 23 to close the open first end 24. The filter material 27 is formed in a circular plate shape, fitted and firmly fixed, by welding or the like, to the open first end 24 of the filter material 23. At the circumference of the open second end 25 of the filter material 23, a circumferential flange 26 is formed all around the open second end 25 so as to extend toward a radially outward direction. The strainer element 22 is disposed so as to be coaxial with the main body case 3, and the open second end 25 is fitted to an inner surface of the main body lid 4, and thereby connected to the outflow port 7. The filter material 23 and the filter material 27 are, for example, formed of stainless wire mesh, and a 40-mesh filter is used, for example.

Figure 1:
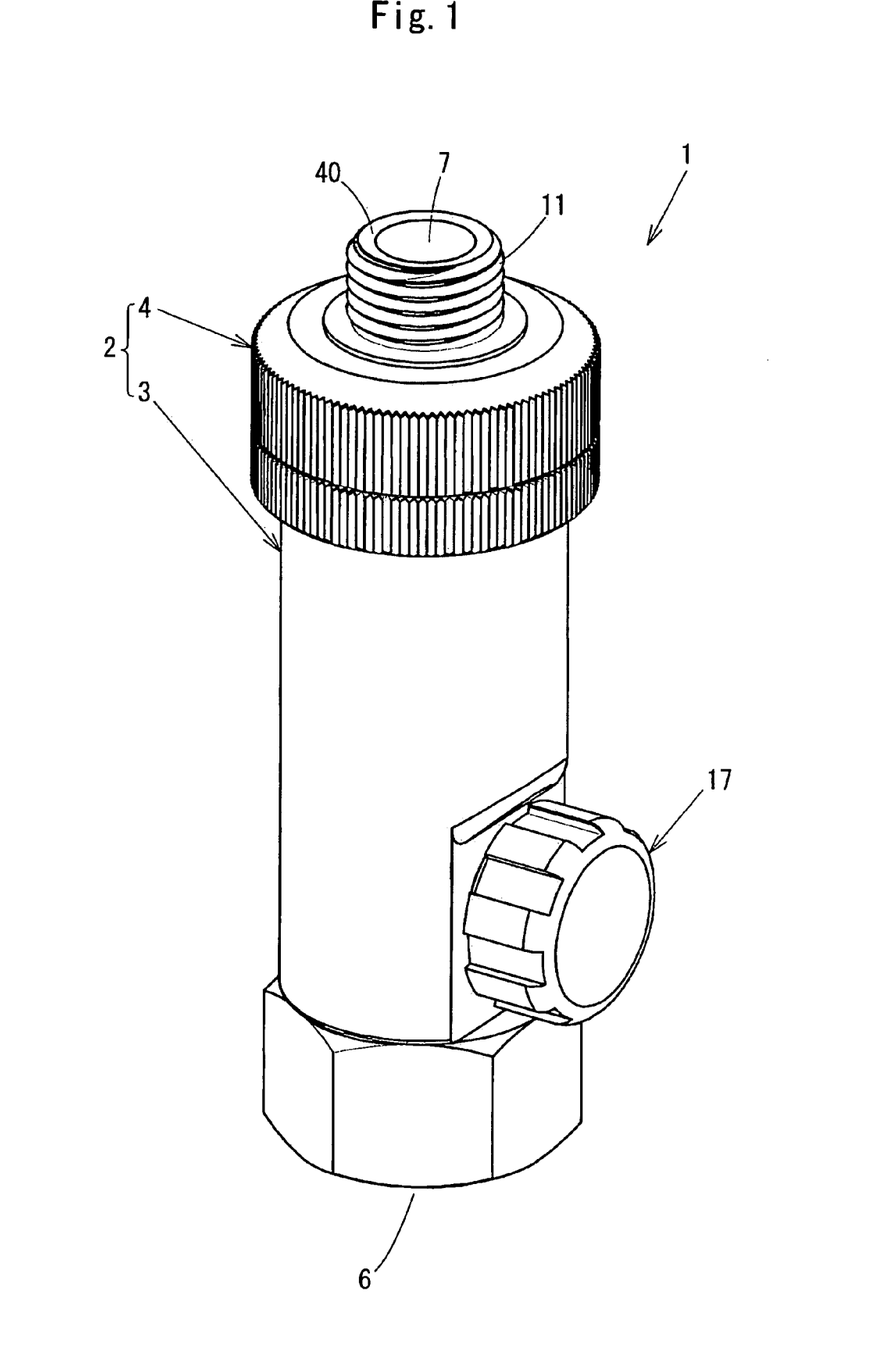
FIG. 1 is a perspective view of an in-line strainer according to an embodiment of the present invention.
Figure 2:
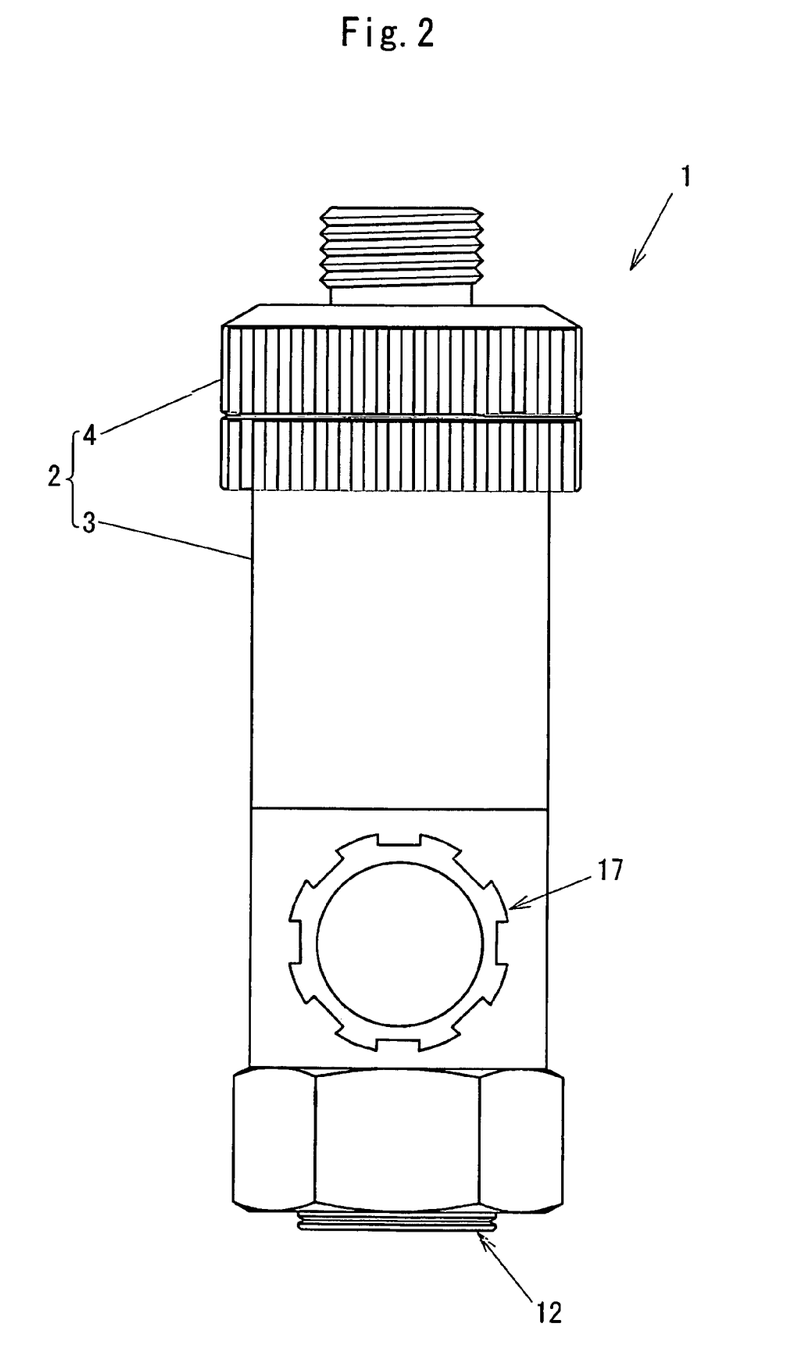
FIG. 2 is a front view of the in-line strainer.
Figure 3:
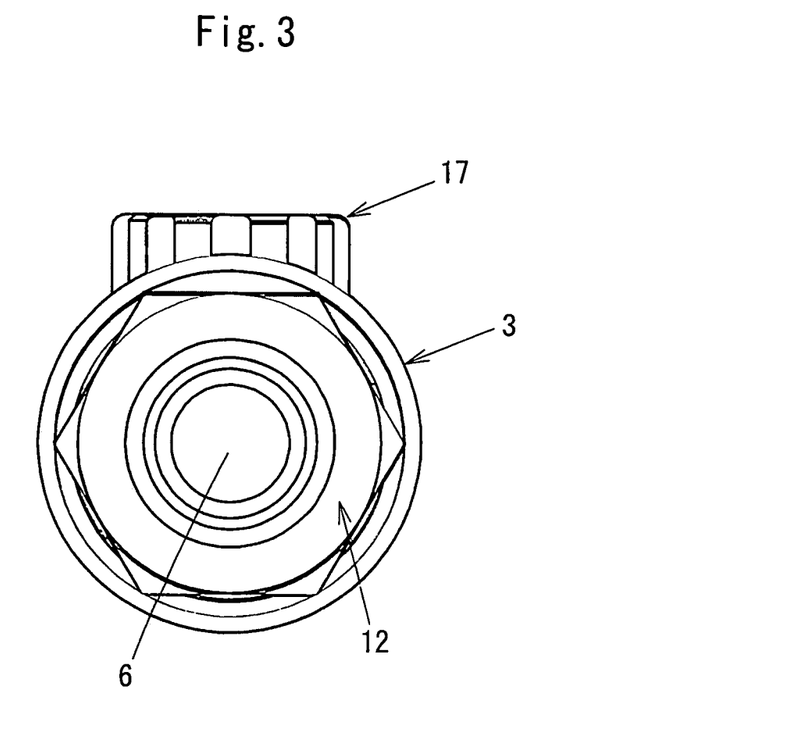
FIG. 3 is a bottom view of the in-line strainer.
Figure 4:
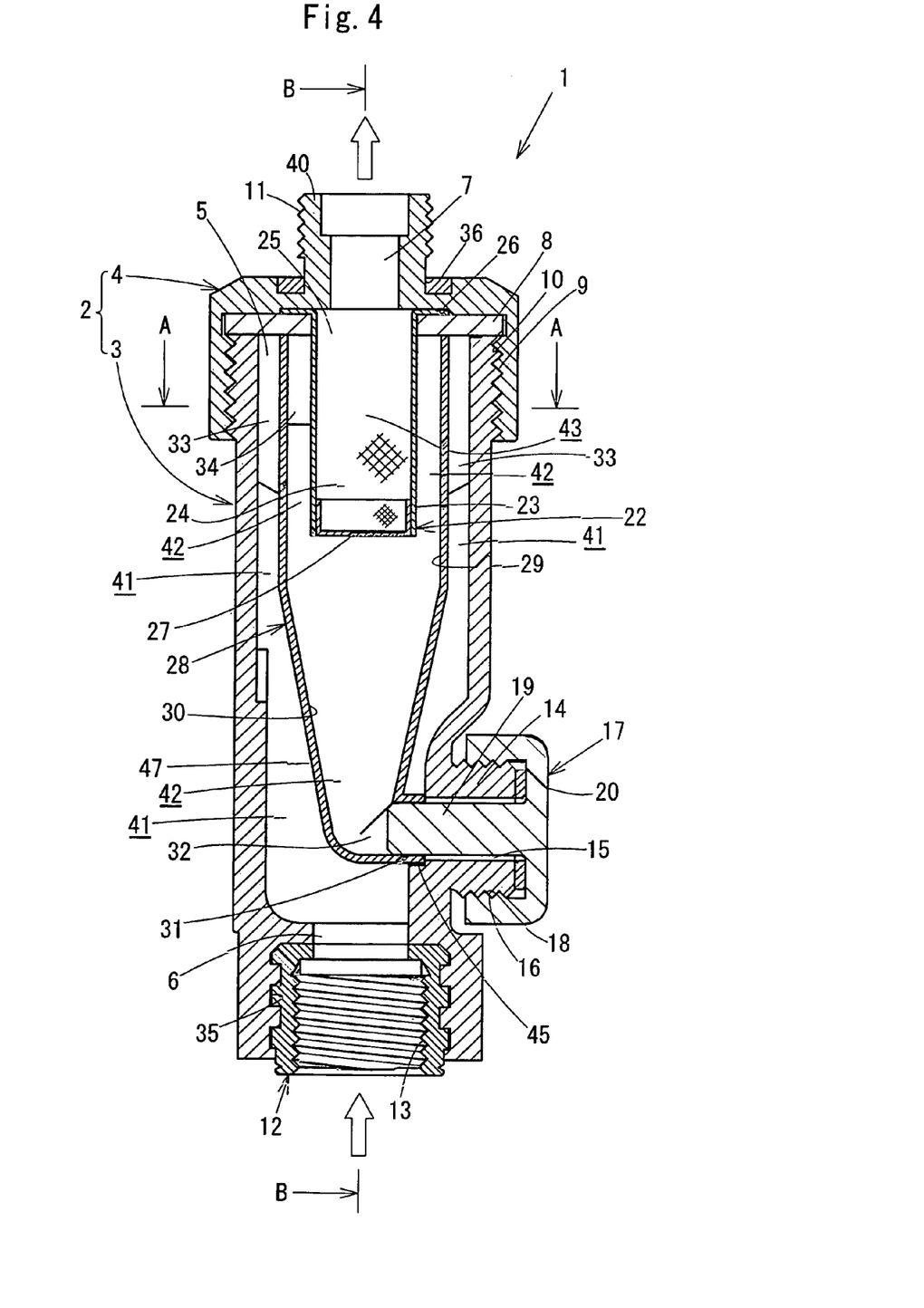
FIG. 4 is a side cross-sectional view of the in-line strainer.
Figure 5:
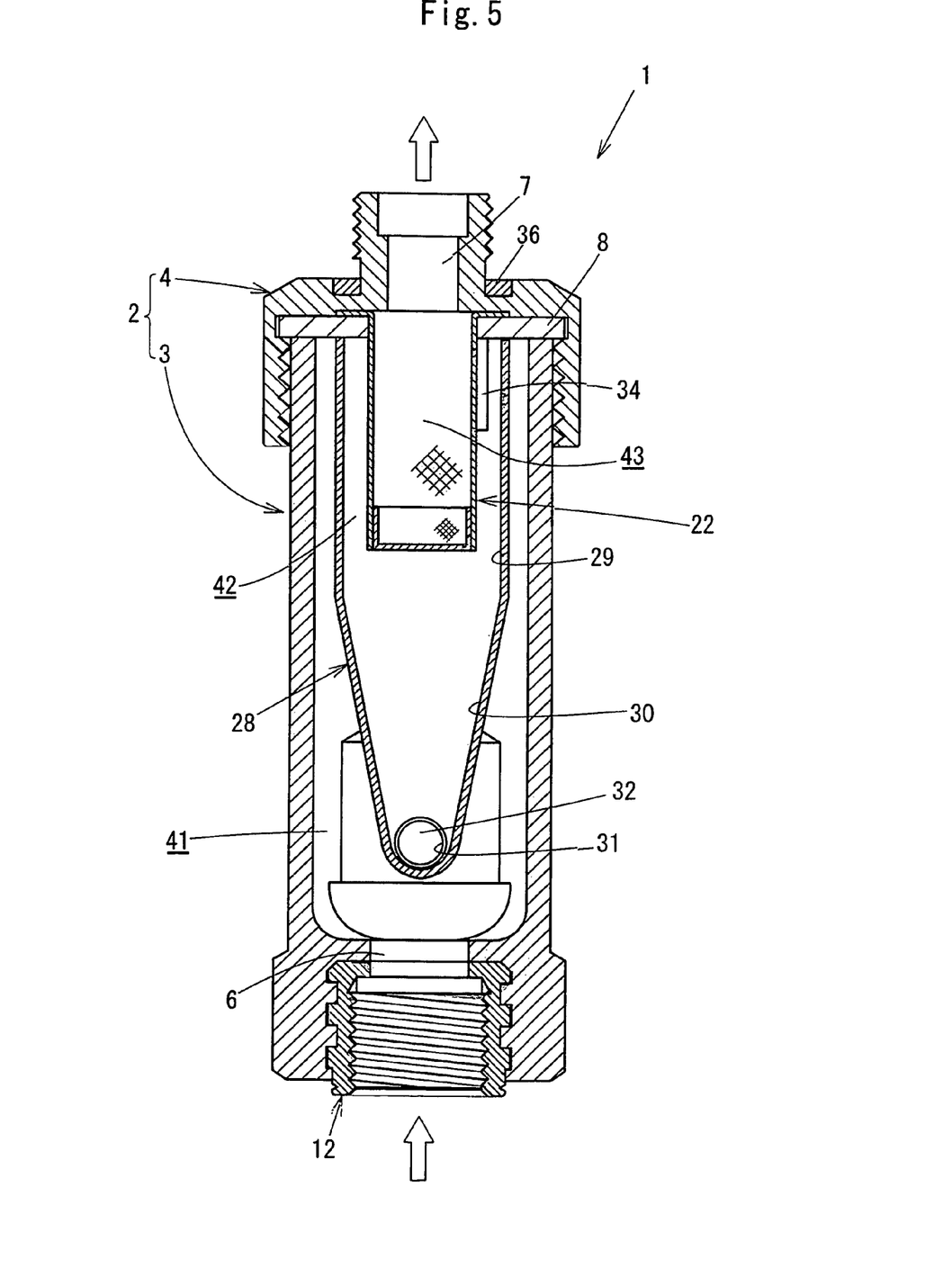
FIG. 5 is a cross-sectional view of the in-line strainer as viewed from a B-B line shown in FIG. 4.
Figure 6:
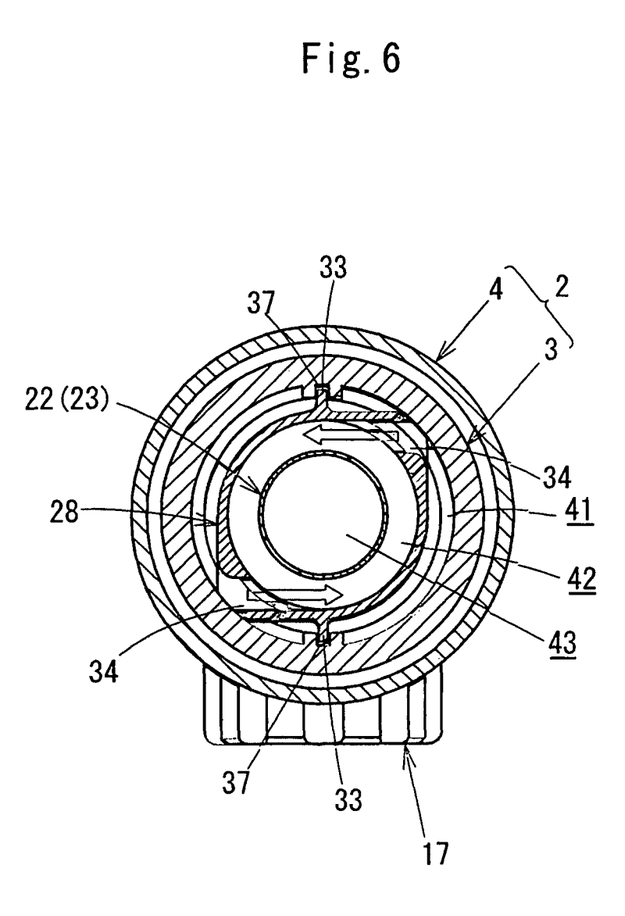
FIG. 6 is a cross-sectional view of the in-line strainer as viewed from an A-A line shown in FIG. 4.
Figure 7:
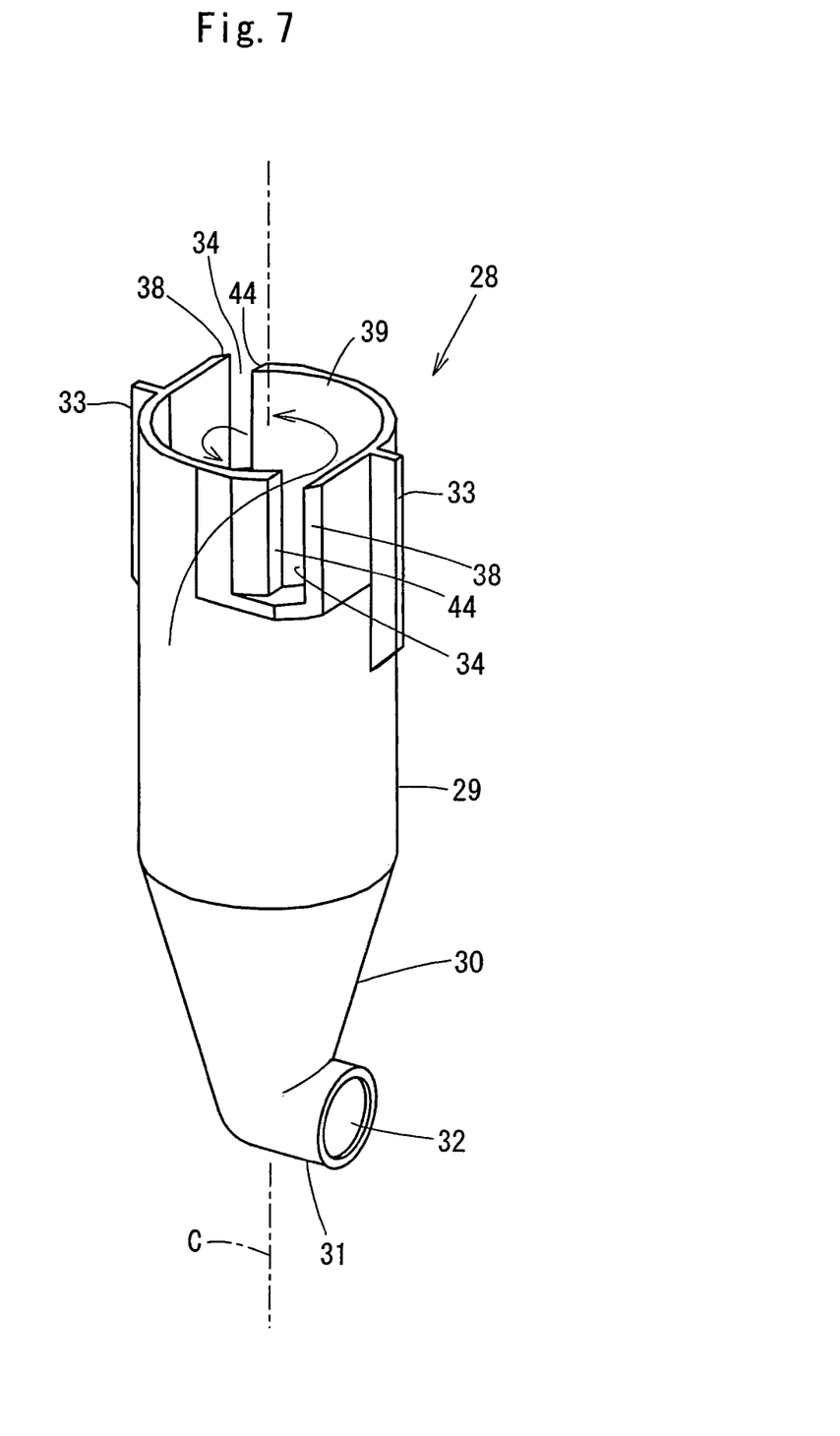
FIG. 7 is a perspective view of a cyclone cylindrical body of the in-line strainer.

As shown in FIG. 7, the cyclone cylindrical body 28 includes a cylinder barrel portion 29 formed in a cylindrical shape, and a diametrically-reduced cylinder portion 30 which is formed integrally with the cylinder barrel portion 29 so as to extend therefrom, and whose inner diameter is gradually reduced toward an end thereof. An outer circumferential surface of the diametrically-reduced cylinder portion 30 is formed as a taper surface 47, the taper having an outer diameter gradually reduced toward a distal end of the diametrically-reduced cylinder portion 30. At the distal end of the diametrically-reduced cylinder portion 30, an extraction pipe 31 is integrally formed so as to extend toward a direction perpendicular to a cylinder center line (a chain line C in FIG. 7) of the cylinder barrel portion 29. The extraction pipe 31 has an extraction opening portion 32 which allows communication between an inside and an outside of the diametrically-reduced cylinder portion 30. The stopper 19 of the lid 17 is inserted into the extraction opening portion 32 from the external opening portion 15 of the branch pipe 14. A pair of locking projections 33 are formed so as to project toward a radially outward direction on an outer circumferential surface of the cylinder barrel portion 29 in an opposed manner. An end of the cylinder barrel portion 29, the end being on a side opposite to the diametrically-reduced cylinder portion 30, is a cyclone outflow port 39. A pair of cyclone inflow ports 34 are formed in the cylinder barrel portion 29, in the vicinity of the cyclone outflow port 39, so as to be diagonally opposed to each other. Guiding edge portions 38, which each constitute a part of each cyclone inflow port 34, are formed so as to project toward a radially outward direction, and guiding edge portions 44, which each are opposed to a corresponding one of the guiding edge portions 38, are formed so as to curve in toward a radially inward direction.

Due to a characteristic shape of the guiding edge portions 38 and 44, a liquid entering from the cyclone inflow port 34 flows in a tangential direction on an inner circumferential surface of the cylinder barrel portion 29. The cyclone cylindrical body 28 is also formed of a transparent material, such as polyethylene naphthalate, by molding. That is, the cyclone cylindrical body 28 is disposed in a space between the inner circumferential surface of the main body case 3 and an outer circumferential surface of the strainer element 22, so as to be coaxial with the main body case 3. The diametrically-reduced cylinder portion 30 of the cyclone cylindrical body 28 is disposed on a side close to the inflow port 6 of the main body case 3, and the cyclone inflow port 34 is disposed on a side close to the outflow port 7. The filter material 27, which is a distal end of the strainer element 22, is disposed so as to be directed to the distal end of the diametrically-reduced cylinder portion 30 in the cyclone cylindrical body 28. The length of the cylinder barrel portion 29 in the cylinder center line direction is approximately the same as that of the diametrically-reduced cylinder portion 30 in the same direction. When the cyclone cylindrical body 28 and the strainer element 22 are disposed in place in the housing 2, a distal end of the filter material 27 is located inside the cylinder barrel portion 29 in the housing 2, and does not reach a region of the diametrically-reduced cylinder portion 30. Due to such a structure, a cyclone flow inside the diametrically-reduced cylinder portion 30 is not hampered.

In the in-line strainer 1 having the above-described configuration, the inside of the housing 2 is a liquid path which is communicated with the inflow port 6 and the outflow port 7. The liquid path includes a first path 41 which is connected to the inflow port 6, a second path 42 which is separated by the cyclone cylindrical body 28 from the first path 41 and which is formed in the cyclone cylindrical body 28, and a third path 43 which is separated by the strainer element 22 from the second path 42 so as to allow a liquid to pass therebetween freely and which is located in the filter material 23 connected to the outflow port 7. The first path 41 and the second path 42 are communicated with each other via the cyclone inflow ports 34.

Figure 8:
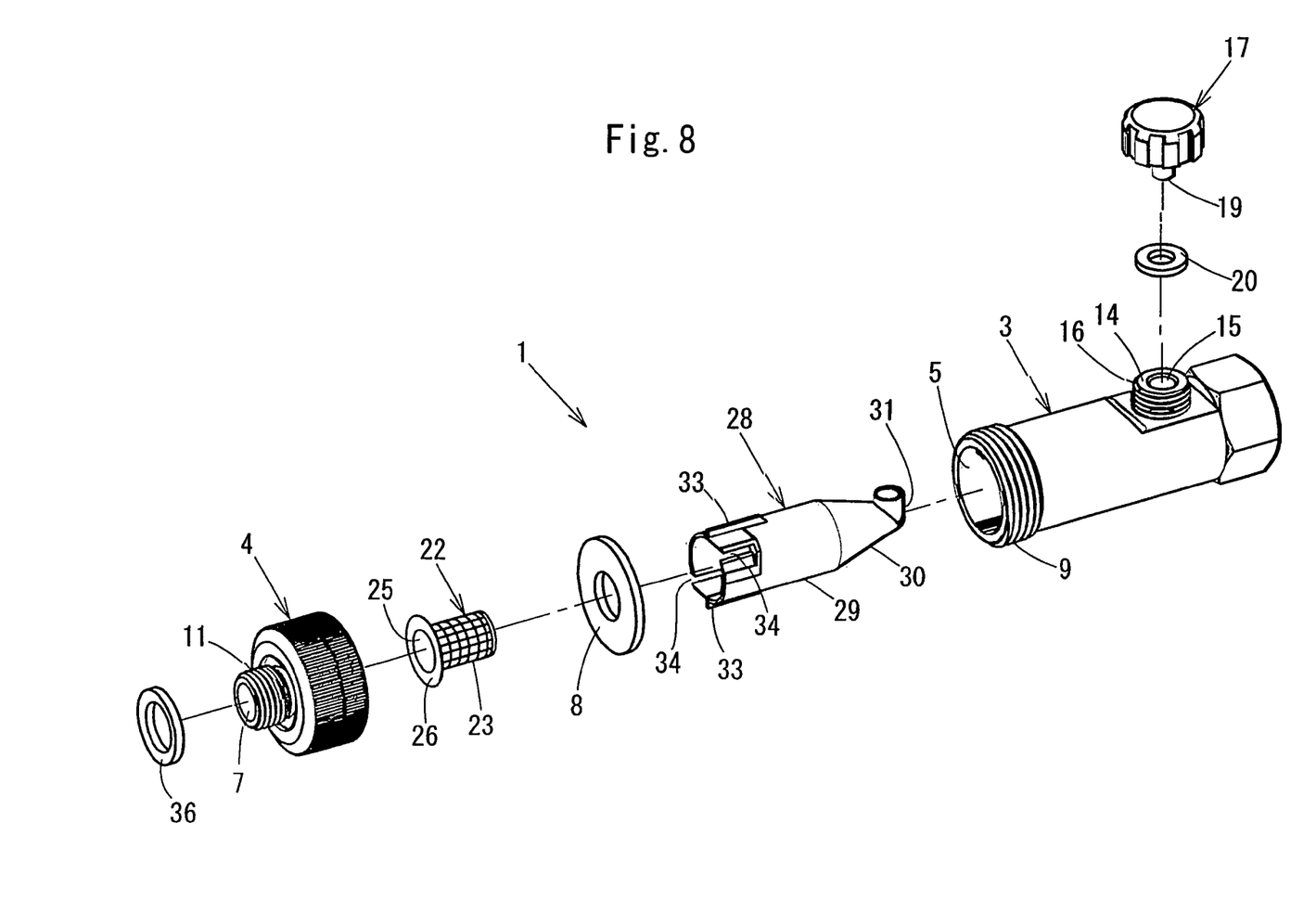
FIG. 8 is an exploded perspective view of the in-line strainer.

An exemplary procedure for assembling the in-line strainer 1 will be described. The fitting portion 12 is fitted to the fitting grooves 35 of the main body case 3 in advance. Thus, as shown in FIG. 8, an operator fits the gasket 36 to the root of the tube portion 40 of the main body lid 4. Then, the cyclone cylindrical body 28 is inserted from the opening portion 5 into the main body case 3. At that time, the locking projections 33 of the cyclone cylindrical body 28 are inserted and guided into the engaging grooves 37 of the main body case 3. At this time, the extraction pipe 31 abuts on the receiving port 45 of the main body case 3, whereby the cyclone cylindrical body 28 is positioned and supported inside the main body case 3. In this state, the extraction opening portion 32 of the extraction pipe 31 faces and is connected to the external opening portion 15 of the branch pipe 14, and an edge surface of the cyclone outflow port 39 of the cyclone cylindrical body 28 is approximately flush with the edge surface of the opening portion 5 of the main body case 3.

Next, the gasket 8 is fitted on the open second end 25 side of the outer circumferential surface of the strainer element 22. The strainer element 22 is inserted from the cyclone outflow port 39 into the cyclone cylindrical body 28. At this time, the gasket 8 abuts on a circumferential edge of each of the cyclone outflow port 39 of the cyclone cylindrical body 28 and the opening portion 5 of the main body case 3, whereby the gasket 8 and the strainer element 22 are supported. Further, the internal threads 10 of the main body lid 4 engage with the external threads 9 of the main body case 3, whereby the gasket 8 is compressed, and the opening portion 5 of the main body case 3 is sealed. Accordingly, the circumferential edge of the open second end 25 of the strainer element 22 comes into close contact with the lower surface of the main body lid 4, and the open second end 25 is communicated with the outflow port 7.

Next, the gasket 20 is fitted to the root of the stopper 19 of the lid 17. Then, the stopper 19 is inserted into the branch pipe 14 from the external opening portion 15. The external threads 16 engage with the internal threads 18, whereby the gasket 20 is compressed, the external opening portion 15 of the branch pipe 14 is sealed, and an end of the stopper 19 is inserted inside the extraction pipe 31 of the cyclone cylindrical body 28. Accordingly, a series of procedure for assembling the in-line strainer 1 is completed. It is noted that the procedure for assembling the in-line strainer of the present invention is not limited to the above procedure, but there are many ways of procedures for assembling.

The in-line strainer 1 structured as described above is used such that the external threads 11 engage with internal threads (not shown) at a tail end of a chemical solution spraying tube whose front end is fitted with a nozzle, for example, and that the internal threads 13 in the fitting portion 12 engage with external threads (not shown) at an end of a hose connected to a discharge pipe of a pump. Thus, an agricultural chemical solution discharged from the pump to the hose flows through the inflow port 6 of the main body case 3 to the first path 41. The agricultural chemical solution in the first path 41 flows toward the opening portion 5 at the other end, and in this case, the solution is guided smoothly so as to spread toward a radial direction along the taper surface 47, which is an outer circumferential surface of the cyclone cylindrical body 28. The taper surface 47 enhances a flow rate of the agricultural chemical solution flowing in a space between the outer circumferential surface of the cylinder barrel portion 29 of the cyclone cylindrical body 28 and the inner circumferential surface of the main body case 3, the space being the narrowest space in the first path 41, and thus, the taper surface 47 exerts an effect of smoothly guiding the agricultural chemical solution to the space, thereby enhancing the flow rate.

The agricultural chemical solution having the increased flow rate reaches the vicinity of the opening portion 5 at the other end, and flows to the second path 42 inside the cyclone cylindrical body 28 through the cyclone inflow ports 34 at a high flow rate. At this time, due to the characteristic shape of the guiding edge portions 38 and 44, the agricultural chemical solution flows in a tangential direction in the cyclone cylindrical body 28, and flows at a high flow rate while revolving along the inner circumferential surface of the cyclone cylindrical body 28. Accordingly, among impurities such as dirt and gravel mixed with the agricultural chemical solution, impurities which have larger specific gravity are hit on the inner circumferential surface of the cylinder barrel portion 29, and then are separated from the agricultural chemical solution. The impurities separated from the agricultural chemical solution are guided along the inner circumferential surface of the diametrically-reduced cylinder portion 30, and accumulated on the bottom of the diametrically-reduced cylinder portion 30.

On the other hand, the agricultural chemical solution guided along the diametrically-reduced cylinder portion 30 changes its direction toward the main body lid 4 while revolving. In this case, the agricultural chemical solution is smoothly guided, due to the presence of the filter material 27 of the strainer element 22, toward the outer circumferential portion of the filter material 27, and flows toward the outside of the filter material 23. The strainer element 22 including the filter material 27 may be replaced with a strainer element 83B, as shown in FIG. 11B, which has four crimped portions 94 at its one end. In this case, the four crimped portions 94 hampers the agricultural chemical solution, which is to change its direction inside the diametrically-reduced cylinder portion 30 toward the main body lid 4, from revolving in the circumferential direction. As a result, a flow of the agricultural chemical solution, which revolves and flows toward the distal end of the diametrically-reduced cylinder portion 30 so as to separate impurities therefrom, is inhibited, and thus efficiency of separation of impurities in the diametrically-reduced cylinder portion 30 is decreased.

When the agricultural chemical solution passes through the filter material 23, the filter material 23 captures impurities having smaller specific gravity and a smaller grain diameter than such impurities that are captured in the cyclone cylindrical body 28. The agricultural chemical solution, which has the impurities filtered and removed with the filter material 23, flows through the third path 43 in the strainer element 22, and flows in the chemical solution spraying tube through the outflow port 7, thereby being sprayed from the nozzle onto agricultural crops.

The impurities accumulated in the diametrically-reduced cylinder portion 30 of the cyclone cylindrical body 28 is visibly checked from the outside through the main body case 3 and the cyclone cylindrical body 28 which are both transparent. Therefore, it is possible to check contents and conditions, or amounts of the impurities inside the diametrically-reduced cylinder portion 30, which is useful for determining when the impurities are to be extracted. To extract the accumulated impurities, the lid 17 is loosened, and the impurities are extracted from the branch pipe 14. In this case, the external opening portion 15 of the branch pipe 14 and extraction opening portion 32 of the cyclone cylindrical body 28 become open. Accordingly, the agricultural chemical solution flowing from the cyclone inflow ports 34 to the second path 42 is gushed out from the external opening portion 15 of the branch pipe 14. Together with the agricultural chemical solution, the impurities inside the diametrically-reduced cylinder portion 30 are discharged to the outside. In this case, when a bucket or the like is prepared, it is possible to receive the agricultural chemical solution and the impurities, which are gushed out from the branch pipe 14, by using the bucket, and thus it is possible to perform removal operation without getting the operator's hands wet.

As described above, the in-line strainer 1 enables extraction of impurities inside the cyclone cylindrical body 28 by uncovering the lid 17 from the branch pipe 14, instead of detaching the chemical solution spraying tube or the hose from the in-line strainer 1. In addition, since the on-off valve is provided to the lid 17, the pump need not be stopped for extraction of impurities. The above-described impurity removal operation is very simple, and thus the operation is not felt as a heavy burden even if the operation is performed frequently. In addition, it is possible to prevent the agricultural chemical solution, which is expensive and needs to be handled carefully, from being drained vainly.

Further, a large amount of impurities is captured in the cyclone cylindrical body 28, and the remaining impurities are captured by the strainer element 22. Thus, filtration load on the whole of the strainer is shared by the cyclone cylindrical body 28 and the strainer element 22. Further, since it is possible to extract the impurities, captured in the cyclone cylindrical body 28, to the outside from the external opening portion 15 of the housing 2, and the impurities captured by the strainer element 22 is relatively small, the strainer element 22 need not be cleaned frequently. It is possible to assemble and disassemble the in-line strainer 1 easily, and also possible to maintain and clean all the parts thereof easily. In the in-line strainer 1, a cyclone flow is generated in the cyclone cylindrical body 28, which causes a pressure loss between the inflow port 6 and the outflow port 7. However, since the strainer element 22 is accommodated inside the cyclone cylindrical body 28, the strainer element 22 inhibits the cyclone flow to some degree, and consequently the pressure loss is decreased.

Further, a strainer is known, for example, which has an inflow port and an outflow port formed on a circumferential wall of the housing, and which includes a cyclone cylindrical body arranged inside the housing in a manner that a distal end of its diametrically-reduced cylinder portion is directed to a direction perpendicular to a line connecting between the inflow port and the outflow port. Such a strainer has a large size, and thus is installed on the ground in most cases. On the other hand, although the in-line strainer 1 of the present embodiment is provided with the cyclone cylindrical body 28, the housing 2 has the inflow port 6, the cyclone cylindrical body 28, the strainer element 22, and the outflow port 7 arranged therein so as to be coaxial with one another. Thus, it is possible to realize a compact in-line type strainer which is space-saving and light-weighted. Therefore, it is advantageous that even when the strainer is fitted to the root of the chemical solution spraying tube, the presence of the strainer does not interfere with a spraying operation.

Figure 9A:
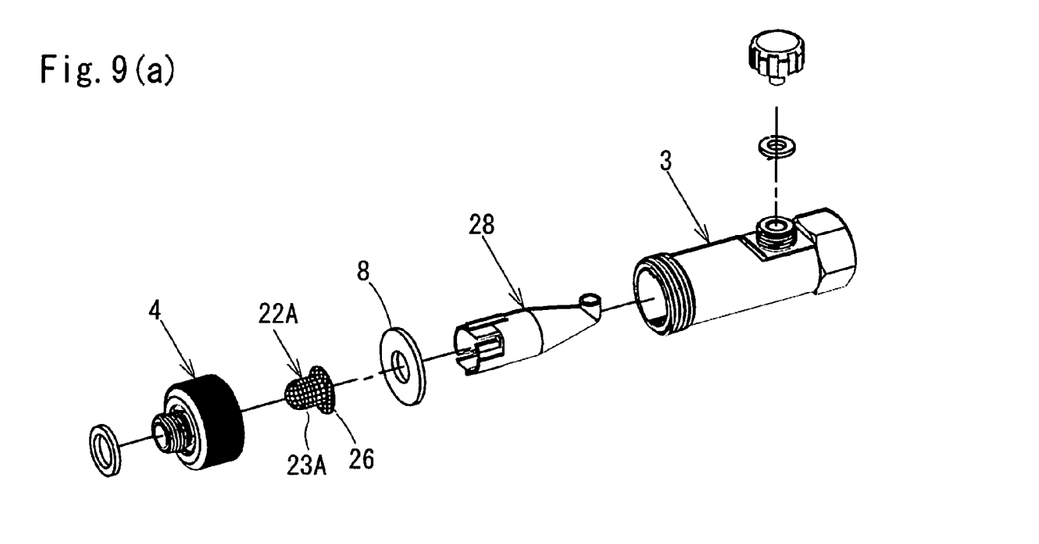
FIG. 9A is an exploded perspective view of an in-line strainer according to another embodiment of the present invention.
Figure 9B:
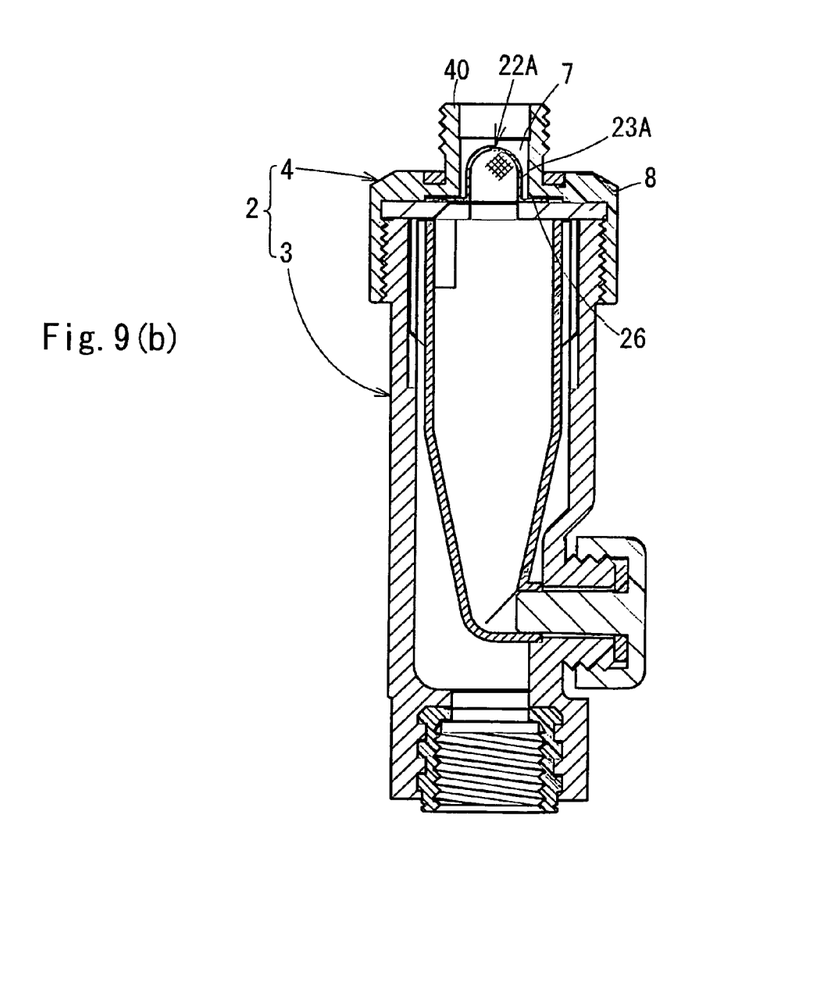
FIG. 9B is a side cross-sectional view of the in-line strainer according to the another embodiment.

In the above embodiment, an exemplary case has been described where the strainer element 22 is fitted into the housing 2 such that the filter material 23 and the filter material 27 are accommodated inside the cyclone cylindrical body 28. However, the strainer element of the present invention is not limited thereto. The strainer element 22 may be replaced with a wire mesh strainer element 22A shown in FIG. 9, for example. The strainer element 22A includes a filter material 23A which has an end portion formed in a semispherical shape, and which has a circumferential flange 26 provided at a circumferential edge of an opening portion of the filter material 23A. The strainer element 22A is fitted such that the filter material 23A is arranged inside an outflow port 7 of a housing 2, and that the circumferential flange 26 is interposed between an inner surface of a main body lid 4 and a gasket 8.

Figure 10A:
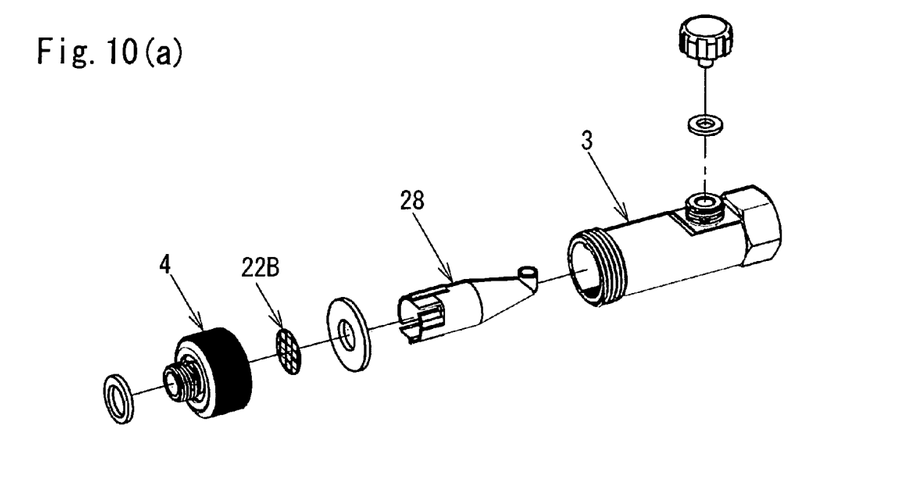
FIG. 10A is an exploded perspective view of an in-line strainer according to still another embodiment of the present invention.
Figure 10B:
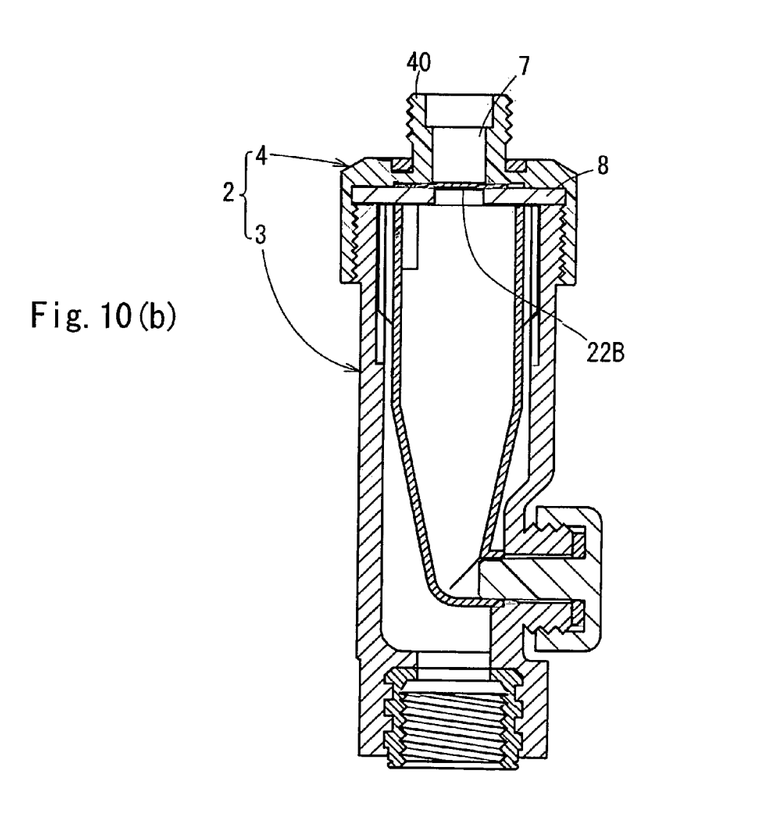
FIG. 10B is a side cross-sectional view of the in-line strainer according to the still another embodiment.

Further, the strainer element 22 may be replaced with a strainer element 22B shown in FIG. 10, for example. The strainer element 22B is formed of a wire mesh in a flat circular disc shape. The strainer element 22B is fitted so as to be interposed between an inner surface of a main body lid 4 and a gasket 8.

Further, in the above description, the stainless steel wire mesh is used as the material of the strainer element, however, the present invention is not limited thereto. For example, punching metal having an infinite number of tiny pores, sintered metal, nonwoven fabric made of synthetic fiber, and the like may be used as a filtering material. In addition, the filter material 27 of a circular plate shape is used as the closing portion of the strainer element. However, the filter material 27 may be replaced with a closing portion having an outer circumferential surface of a taper shape or a semispherical shape whose outer diameter is gradually reduced toward its distal end. In this case, the closing portion may be formed with solid synthetic resin or solid metal instead of a concave-shaped wire mesh.

What is claimed is:

1. An in-line strainer, comprising:
   a cylindrical-shaped housing having a first axial end on which an inflow port for liquid is formed, and a second axial end on which an outflow port is formed;
   a strainer element disposed in the housing; and
   a cyclone cylindrical body having a diametrically-reduced cylinder portion whose inner diameter is reduced toward a first end of the cyclone cylindrical body, and having a cyclone outflow port formed at an open second end of the cyclone cylindrical body, wherein
   the cyclone cylindrical body is arranged inside the housing such that the diametrically-reduced cylinder portion is arranged close to the inflow port of the housing, and such that the cyclone outflow port is connected to the outflow port of the housing,
   the cyclone cylindrical body has a pair of cyclone inflow ports formed on a circumferential wall thereof in the vicinity of the cyclone outflow port, the cyclone inflow ports being diagonally opposed to each other,
   each cyclone inflow port includes a first guiding edge portion which projects in a radially outward direction, and a second guiding edge portion which curves in a radially inward direction toward an interior of the cyclone cylindrical body, the second guiding edge portion being opposed to the first guiding edge portion,
   the strainer element is fitted into the housing between the outflow port of the housing and the cyclone outflow port,
   the housing has an external opening portion formed on a cylindrical wall thereof so as to be communicated with an outside,
   the cyclone cylindrical body has an extraction opening portion formed at a distal end of the diametrically-reduced cylinder portion, the extraction opening portion being connected to the external opening portion,
   the extraction opening portion is arranged so as to face in a direction which is perpendicular to an axial direction of the cyclone cylindrical bodes,
   the strainer element is formed in a shape of a cylinder having a closed one end and an open other end, and is accommodated in the cyclone cylindrical body, the closed one end being disposed in the cyclone cylindrical body such that a distal end of the closed one end is directed to the distal end of the diametrically-reduced cylinder portion,
   the housing, the inflow port of the housing, the cyclone cylindrical body, the strainer element and the outflow port of the housing are arranged coaxially with each other, and
   the inflow port of the housing and the outflow port of the housing are arranged such that a direction in which liquid flows into the in-line strainer through the inflow port of the housing is the same as a direction in which liquid flows out of the in-line strainer through the outflow port of the housing.

2. The in-line strainer according to claim 1, further comprising a lid having a stopper which is removably inserted into the external opening portion for opening and closing the external opening portion.

\* \* \* \* \*